March 1, 1932. J. L. ALDEN 1,847,161
FEEDING APPARATUS
Filed Dec. 31, 1928

Inventor
John L. Alden
By N. W. Patterson Atty.

Patented Mar. 1, 1932

1,847,161

UNITED STATES PATENT OFFICE

JOHN LESLIE ALDEN, OF LA GRANGE, ILLINOIS, ASSIGNOR, BY MESNE ASSIGNMENTS, TO WESTERN ELECTRIC COMPANY, INCORPORATED, OF NEW YORK, N. Y., A CORPORATION OF NEW YORK

FEEDING APPARATUS

Application filed December 31, 1928. Serial No. 329,555.

This invention relates to feeding apparatus, and more particularly to a material feeding apparatus used as a pulling element in the manufacture of strand material.

In the manufacture of strand material such as telephone cables, rubber covered or otherwise insulated wire and the like, it is frequently necessary to provide a capstan or other means for positively advancing the cable or strand from a supply in a forming machine to some other point. Due to the nature of the construction of telephone cable or similar strand materials, it is desirable that the various turns thereof around the capstan be maintained out of engagement with each other during the pulling or advancing movement to prevent the cable or other strand material from being deformed due to lateral pressures.

The primary object of this invention is to provide a material feeding apparatus which positively withdraws material from a supply and delivers it to another point without deleterious deformation.

In accordance with the general features of this invention, in order to accomplish this object, there is provided a cylindrical capstan around which the cables or other strand material is wrapped in a plurality of helical turns in order to advance the cable as the capstan is rotated. A plurality of worm members are located in spaced peripheral recesses of the capstan and are positively driven by the rotation of the capstan so that the turns of cable resting within the depressions of the worm members are positively carried along the face of the capstan in spaced relation and discharged at one end thereof.

A clear understanding of the invention may be had from the following description when taken in connection with the accompanying drawings, illustrating one embodiment of the invention, and wherein Fig. 1 is an elevational view of the structure with a cable wound thereon;

Figure 2:
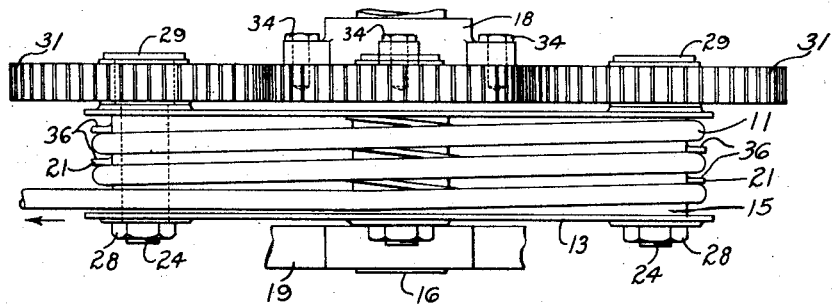
Fig. 2 is a view looking down upon the same structure, taken transversely to the view in Fig. 1.

Referring now to the drawings in which like numerals designate similar parts throughout the various figures, there is disclosed a device 10 of any suitable character which supplies a strand material, such as a telephone cable 11, and it is the purpose of this invention to positively and carefully advance the cable 11 from the supply to some suitable means for receiving it (not shown).

Figure 1:
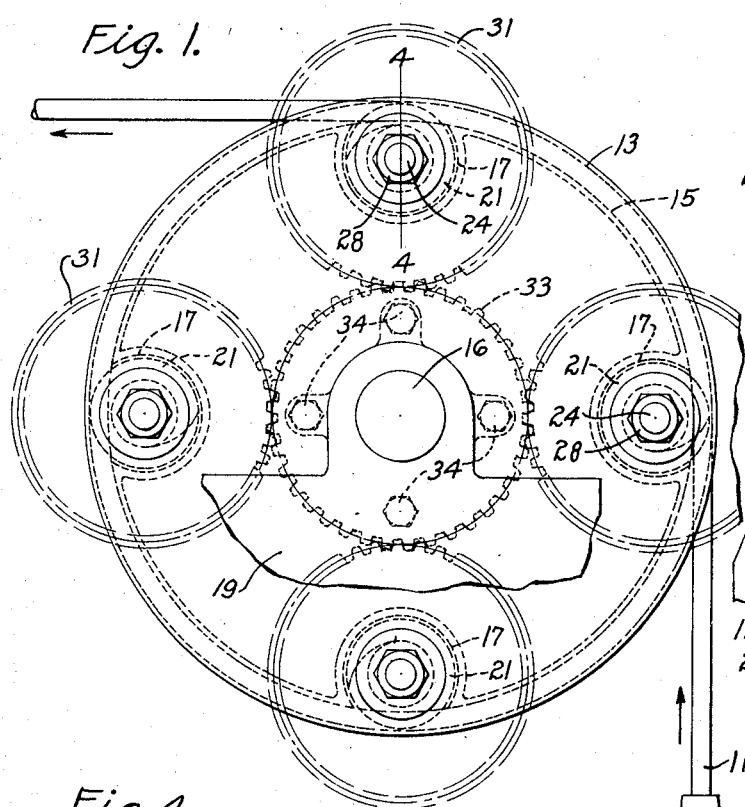

In order to carry out this purpose there is provided a familiar capstan 13 having a cylindrical face 15 about which a plurality of single layer, helical turns of the cable 11 are wrapped to grip the face, with the free end of the cable directed towards the receiving means, as indicated in Figs. 1 and 2. A driving shaft 16 journaled in suitable brackets 18 and 19, and secured in any suitable manner to the floor or other support, mounts the capstan in operating position.

Figure 4:
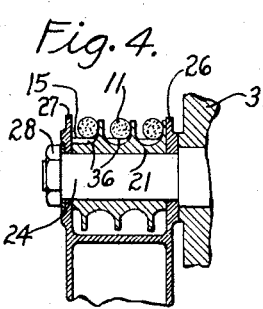
Fig. 4 is a detail view of the structure showing the strands of cable being maintained separated.

Transverse of the capstan face 15 and within recesses 17 provided therein there are rotatably mounted a plurality of worm members 21 which are adapted to engage the aforementioned separated turns of the helically wound cable and maintain the turns separated so they will not bind upon each other and thus deform the cable while the capstan is advancing it in its longitudinal direction, to be more fully described below. These worm members 21 are rotatably mounted by means of axial shafts 24 which extend through and are journaled in the ends 26 and 27 of the capstan, as shown in Fig. 4. Nuts 28 are secured to the threaded ends of the shafts.

The shafts 24 are provided with large head ends 29 which secure gears 31 thereon, and these gears and the worm members are both fixed or keyed to the shafts 24. It is to be noted that the gears 31 are thus mounted to move around with the capstan 13, and a stationary gear 33 secured by bolts 34 to the bracket 19 is provided for meshing with the gears 31 and rotating them. The purpose of these various structures will now become apparent from the following description of the operation of the device.

In the operation of the structure, the cable 11 extending from its supply 10 is first wound in a single layer, helical form, about the capstan face 15, with the turns of the helix maintained separated by placing them within depressions 36 in the worm members 21 designed for this purpose. The free end of the cable 11 is directed towards the means for receiving the cable as it is rotated off one side of the capstan, as shown in Figs. 1 and 2. The capstan is then rotated by actuating the driving shaft 16 from any suitable source of power (not shown) and this rotation, of course, moves the cable 11 longitudinally of itself in a direction away from the supply 10, around face 15 and towards the receiving means (not shown).

Figure 3:
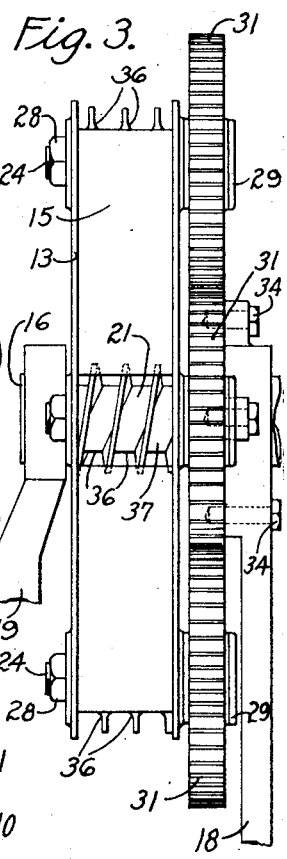
Fig. 3 is an end view of the structure shown in Fig. 1, with the cable removed.

At the same time that the cable 11 is thus being moved longitudinally of itself by the capstan 13, the worm members 21 engaging the separated helical turns of the cable of course move with the cable about the axis of the capstan. At this time, also, the worm members 21 are rotated about their own axes by the gears 31 engaging the stationary gears 33, and thus the worm members 21 gradually force the helical turns of cable across the face 15 of the capstan and always maintain the same helical form of cable thereon. Thus it is to be understood that the worm members 21 always preserve the helical turns of cable out of contact with each other while the cable is advanced along its longitudinal axis in order to prevent the binding of these turns on each other to deform or damage the cable. Thus it is to be understood that by advancing the cable longitudinally in this manner and maintaining the spiral turns thereof out of contact with each other during the longitudinal movement to prevent deleterious deformation, the structure accomplishes the purpose for which it was designed. Of course, the worm members 21 must be correctly designed and relatively timed for carrying out this purpose, and it is necessary that the worm depression, first engaging the cable as it comes from the supply, designated 37 in Fig. 3, should be correctly positioned for making this engagement.

It is to be understood, of course, that the invention is not to be limited by the specific structure here illustrated and described, as being particularly useful for advancing cable, but may equally well be employed for advancing rubber covered or other insulated wire as well as other types of strand material and is limited only by the scope of the appended claims.

What is claimed is:

1. In a strand material feeding apparatus, a capstan, means for causing the rotation of the capstan for advancing material thereon, and means rotatable on an axis parallel to the axis of the capstan and mounted in the capstan adjacent the peripheray thereof for moving the material axially thereof.

2. In a strand material feeding apparatus, a rotatable capstan for receiving turns of strand material and having a recess in the periphery thereof, means for rotating the capstan to advance the strand material, a screw member rotatably mounted in the recess for engaging and maintaining separated the turns of the strand material, and means operated by the rotation of the capstan for actuating the screw member to move the turns of strand material along the axis of the capstan.

3. In a strand material feeding apparatus, means for advancing a strand material along the longitudinal axis of the material, a screw member engaging the strand, and means for actuating the screw member to move the strand across the first mentioned means during the longitudinal advancement of the strand.

4. In a strand material feeding apparatus, a rotatable means for advancing a strand material along the longitudinal axis of the material, and a screw member mounted in the rotatable means and rotating on an axis parallel with the axis of the rotatable means for engaging the strand and moving it axially of the rotatable means.

5. In a strand material feeding apparatus, a rotatable means for advancing a strand material along the longitudinal axis of the material, and a plurality of screw members disposed about the rotatable means for engaging the strand and moving it axially of the rotatable means.

6. In a strand material feeding apparatus, a rotatable means for receiving turns of strand material and advancing the strand along the longitudinal axis of the strand, a plurality of screw members disposed about the rotatable means for engaging the turns of strand and maintaining them separated, and means for rotating the screw members to move the turns of strand axially of the rotatable means.

7. In a strand material feeding apparatus, a rotatable means for receiving turns of strand material and advancing the strand along the longitudinal axis of the strand, and a plurality of screw members adjacent to the periphery thereof for moving the strand ing the turns of strand and separately advancing them axially of the rotatable means.

8. In a strand material feeding apparatus, a rotatable means for advancing a strand longitudinally of its axis, a screw member mounted in the rotatable means adjacent the periphery thereof for moving the strand axially of the rotatable means, and means actuated by the rotatable means for rotating the screw member.

9. In a strand material feeding apparatus, a capstan, means for causing the movement thereof for advancing material thereon, and means rotating on its own axis located adjacent to the periphery of the capstan and revolving around the axis of the capstan for moving the material transversely of the face of the capstan.

10. In an apparatus for advancing strand material longitudinally of itself, a rotating capstan around which the material is spirally wound a predetermined number of times for advancing the material longitudinally, and a plurality of screw members mounted in the periphery of the capstan for advancing the spiral turns of material cross-wise of said periphery and maintaining them separated.

In witness whereof, I hereunto subscribe my name this 19th day of December A. D., 1928.

JOHN LESLIE ALDEN.